United States Patent
Kasahara (10) Patent No.: US 8,270,757 B2
(45) Date of Patent: *Sep. 18, 2012

(54) IMAGE PROCESSING METHOD, IMAGE PROCESSING APPARATUS, AND IMAGING APPARATUS

(75) Inventor: Ryosuke Kasahara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 816 days.

This patent is subject to a terminal disclaimer.

(21) Appl. No.: 12/318,564

(22) Filed: Dec. 31, 2008

(65) Prior Publication Data

US 2009/0202171 A1    Aug. 13, 2009

(30) Foreign Application Priority Data

Feb. 13, 2008    (JP) ................................. 2008-032418

(51) Int. Cl.
 G06K 9/40    (2006.01)
(52) U.S. Cl. ........................................ 382/275; 382/167
(58) Field of Classification Search .................. None
See application file for complete search history.

(56) References Cited

U.S. PATENT DOCUMENTS

| | | | | |
|---|---|---|---|---|
| 5,828,793 A | * | 10/1998 | Mann | ........................... 382/284 |
| 6,747,702 B1 | | 6/2004 | Harrigan | |
| 7,667,738 B2 | | 2/2010 | Utsugi | |
| 2004/0150732 A1 | | 8/2004 | Yamanaka | |
| 2004/0218813 A1 | | 11/2004 | Okada et al. | |
| 2004/0247201 A1 | | 12/2004 | Arazaki | |
| 2007/0103564 A1 | * | 5/2007 | Chiba | ........................ 348/223.1 |
| 2008/0007630 A1 | | 1/2008 | Hara | |
| 2008/0136943 A1 | * | 6/2008 | Azuma | .................... 348/231.99 |

FOREIGN PATENT DOCUMENTS

| | | |
|---|---|---|
| EP | 1 761 072 | 3/2007 |
| EP | 1 855 486 | 11/2007 |
| JP | 2004-274133 | 9/2004 |
| JP | 2004-336106 | 11/2004 |
| JP | 2006-20275 | 1/2006 |
| JP | 2006-345054 | 12/2006 |

OTHER PUBLICATIONS

Office Action dated Aug. 31, 2011 issued in corresponding Japanese Application No. 2008-032418.
European Search Report dated Jun. 2, 2009 for corresponding European Application No. 09150205.4.
Office Action for corresponding Japanese Application No. 2008-032418 mailed May 23, 2012.

* cited by examiner

*Primary Examiner* — Jason M Repko
*Assistant Examiner* — Siamak Harandi
(74) *Attorney, Agent, or Firm* — Harness, Dickey & Pierce (57) ABSTRACT

A magnification chromatic aberration included in image data in a color filter array captured by an imaging device is corrected by performing a coordinate transformation with respect to each pixel in the image data. A defective pixel due to the color filter array is compensated with respect to magnification-chromatic-aberration-corrected image data.

12 Claims, 9 Drawing Sheets

FIG. 2A

G-SIGNAL

FIG. 2B

R-SIGNAL

FIG. 2C

B-SIGNAL

|   | 0 | 1 | 2 | 3 | 4 | 5 |
|---|---|---|---|---|---|---|
| 0 | G(0) | B(1) | G(0) | B(1) | G(0) | B(1) |
| 1 | R(2) | G(3) | R(2) | G(3) | R(2) | G(3) |
| 2 | G(0) | B(1) | G(0) | B(1) | G(0) | B(1) |
| 3 | R(2) | G(3) | R(2) | G(3) | R(2) | G(3) |
| 4 | G(0) | B(1) | G(0) | B(1) | G(0) | B(1) |
| 5 | R(2) | G(3) | R(2) | G(3) | R(2) | G(3) |

WHEN dX>0,
X2=rX+1
OTHERWISE,
X2=rX−1,
Y2=rY

FIG. 9C

X3=rX
WHEN dY>0,
Y3=rY+1
OTHERWISE,
Y3=rY−1

FIG. 9D

WHEN dX>0,
X4=rX+1
OTHERWISE,
X4=rX−1,
Y4=rY

FIG. 9E

WHEN dX>0,
X5=rX+1
OTHERWISE,
X5=rX−1
WHEN dY>0,
Y5=rY+1
OTHERWISE,
Y5=rY−1

FIG. 10

| ARRAY VALUE | SET OF X, Y IN OUTPUT |
|---|---|
| 0 | R→3<br>G→1<br>B→2 |
| 1 | R→5<br>G→4<br>B→1 |
| 2 | R→1<br>G→4<br>B→5 |
| 3 | R→2<br>G→1<br>B→3 |

X5=rX-1
WHEN dY>0, Y5=rY+1
OTHERWISE, Y5=rY-1

X5=rX+1
WHEN dY>0, Y5=rY+1
OTHERWISE, Y5=rY-1
d5=dX+0.5

X3=rX
WHEN dY>0, Y3=rY+1
OTHERWISE, Y3=rY-1

X5=rX-1
WHEN dY>0, Y5=rY+1
OTHERWISE, Y5=rY-1

X3=rX
WHEN dY>0, Y3=rY+1
OTHERWISE, Y3=rY-1
d3=0

X5=rX+1
WHEN dY>0, Y5=rY+1
OTHERWISE, Y5=rY-1
d5=dX+0.5

//<<<<<

IMAGE PROCESSING METHOD, IMAGE PROCESSING APPARATUS, AND IMAGING APPARATUS

CROSS-REFERENCE TO RELATED APPLICATIONS

The present application claims priority to and incorporates by reference the entire contents of Japanese priority document 2008-032418 filed in Japan on Feb. 13, 2008.

BACKGROUND OF THE INVENTION

1. Field of the Invention

The present invention relates to a technology for processing an image captured by an optical system having a wide angle and a large chromatic aberration of magnification.

2. Description of the Related Art

Recently, demands for a wide-angle small imaging apparatus have been increasing for an application such as a back monitor of a vehicle. However, it is difficult to design a small optical system with a small aberration and distortion, and performance needs to be improved in combination with image processing. For example, in Japanese Patent Application Laid-open No. 2006-345054 is described a method of correcting a magnification chromatic aberration generated in an optical system, in an imaging apparatus using an optical system having a distortion, by performing coordinate transformation for each of R (red), G (green), and B (blue) signals obtained by an imaging device such as a charge coupled device (CCD) and a complimentary metal oxide semiconductor (CMOS) to generate different distortion.

Generally, a color filter such as of a Bayer array is provided in the imaging device. In the conventional art, after a defective pixel due to the color filter array such as the Bayer array is interpolated, the magnification chromatic aberration is corrected with respect to a signal obtained by the imaging device.

However, to correspond to an optical system having a large magnification chromatic aberration, a quite large memory capacity is required for the magnification chromatic aberration (for coordinate transformation), and the device becomes very expensive. Further, because the magnification chromatic aberration is different for each color component, a memory capable of addressing independently for each color component is required for correction of the magnification chromatic aberration, and it is necessary to use an expensive 3-port random access memory (RAM) (for example, a static RAM (SRAM)) having a 3-chip configuration or to drive a RAM in a time-sharing manner, which makes the device even more expensive.

SUMMARY OF THE INVENTION

It is an object of the present invention to at least partially solve the problems in the conventional technology.

According to one aspect of the present invention, there is provided a method of processing image data in a color filter array including at least a magnification chromatic aberration captured by an imaging device. The method includes correcting the magnification chromatic aberration by performing a coordinate transformation with respect to each pixel in the image data; and compensating for a defective pixel due to the color filter array with respect to magnification-chromatic-aberration-corrected image data.

Furthermore, according to another aspect of the present invention, there is provided an apparatus for processing image data in a color filter array including at least a magnification chromatic aberration captured by an imaging device. The apparatus includes a magnification-chromatic-aberration correcting unit that corrects the magnification chromatic aberration by performing a coordinate transformation with respect to each pixel in the image data; and a compensating unit that compensates for a defective pixel due to the color filter array with respect to magnification-chromatic-aberration-corrected image data.

Moreover, according to still another aspect of the present invention, there is provided an imaging apparatus including an optical system having a wide view angle and at least a large magnification chromatic aberration; an imaging device that includes a color filter in a predetermined color array and captures an image through the optical system; and an image processing apparatus that processes image data in a color filter array including at least a magnification chromatic aberration captured by an imaging device. The image processing apparatus includes a magnification-chromatic-aberration correcting unit that corrects the magnification chromatic aberration by performing a coordinate transformation with respect to each pixel in the image data, and a compensating unit that compensates for a defective pixel due to the color filter array with respect to magnification-chromatic-aberration-corrected image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. In an embodiment of the present invention, it is assumed that an imaging device includes a Bayer-arrayed color filter; however, the present invention is also applicable to an imaging device including another color filter such as a CMYG array or an RGB+Ir (infrared ray) array. While color components of the image are red (R), green (G), and blue (B) of an additive primary colors, they can be yellow (Y), magenta (M), and cyan (C) of a subtractive primary colors.

Figure 1:
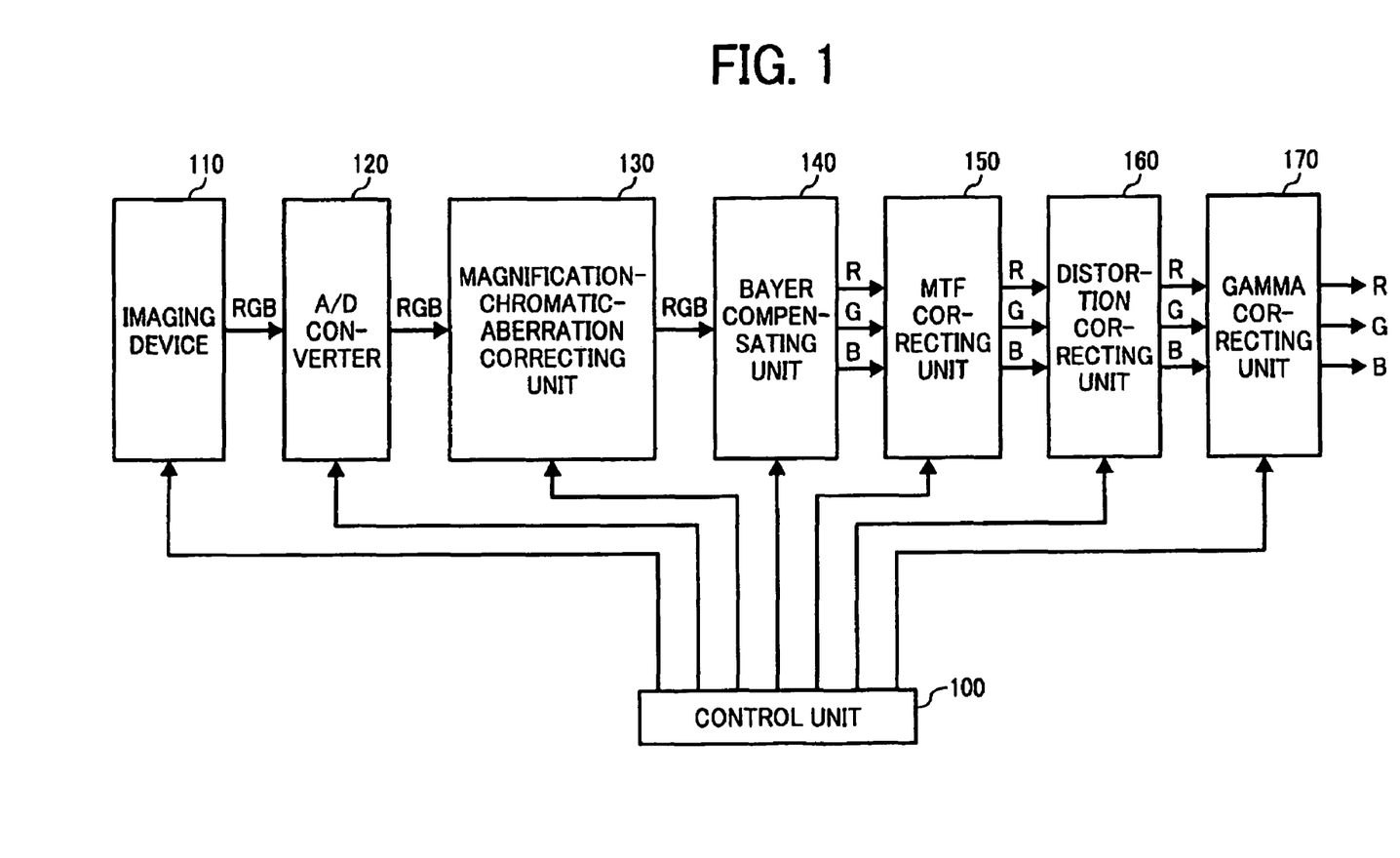
FIG. 1 is an entire block diagram of an operation system of an imaging apparatus according to an embodiment of the present invention.

FIG. 1 is a functional block diagram of an image processing system in an imaging apparatus according to an embodiment of the present invention. In addition to the components shown in FIG. 1, the imaging apparatus according to the embodiment includes an operating unit, an image storage unit, and an image display unit, which are not shown in FIG. 1. The imaging apparatus is used as, for example, a vehicle on-board camera, but it is not the only application that limits the present invention.

As shown in FIG. 1, a control unit 100 provides required control signals (clock, horizontal/vertical synchronization signal, and the like) to respective units to control the operation of the units in a pipelined manner.

An imaging device 110 includes, for example, a CCD or CMOS sensor for converting an optical image captured using the optical system (not shown) having a wide angle and large chromatic aberration of magnification and distortion into an electric signal (pixel signal). A Bayer color filter array is provided in the imaging device 110, and Bayer-arrayed RGB pixel signal is sequentially output based on coordinate value (x, y) given from the control unit 100. The control unit 100 gives the coordinate value (x, y) given to the imaging device 110 to a subsequent stage sequentially by shifting a predetermined time. The coordinate value (x, y) can be generated in the imaging device 110 based on the clock, horizontal/vertical synchronization signal and sequentially given to the subsequent stage.

An analog-to-digital (A/D) converter 120 converts the Bayer-arrayed RGB image signal, which is an analog signal output from the imaging device 110, into a digital signal (image signal) and outputs the digital signal to a magnification-chromatic-aberration correcting unit 130. For example, the image data includes 8 bits for each of RGB. Generally, an AGC circuit is provided at a previous stage of the A/D converter 120; however, it is omitted here.

The magnification-chromatic-aberration correcting unit 130 receives Bayer-arrayed RGB image data, performs coordinate transformation according to a predetermined equation with respect to the image data of the Bayer array as it is to correct the magnification chromatic aberration, and transmits the magnification chromatic aberration-corrected RGB image data of the Bayer array to a Bayer compensating unit 140. Thus, by correcting the magnification chromatic aberration with respect to the Bayer-arrayed RGB image data directly, the memory capacity can be one third of that in a conventional case of correcting the magnification chromatic aberration after Bayer interpolation. However, in a simple coordinate transformation, the Bayer array changes before and after the coordinate transformation, and Bayer interpolation cannot be performed correctly in the Bayer compensating unit 140 at a subsequent stage. That is, the Bayer array needs to be maintained before and after the coordinate transformation. Therefore, when the color of the Bayer array of the source is the same as that of the destination, the magnification-chromatic-aberration correcting unit 130 keeps the coordinate of the source as it is. However, when the color of the Bayer array of the source is different from that of the destination, the magnification-chromatic-aberration correcting unit 130 changes the coordinate of the source, for example, to a coordinate of the same color as that of the destination closest thereto. Accordingly, the Bayer array can be maintained even if correction of the magnification chromatic aberration is performed directly with respect to the Bayer-arrayed RGB image. The magnification-chromatic-aberration correcting unit 130 will be described later in detail.

The Bayer compensating unit 140 receives the magnification chromatic aberration-corrected RGB image data of the Bayer array, generates image data (pixel data) at all coordinate positions by linear interpolation for each color of RGB, and outputs the pixel data to an MTF correcting unit 150.

Figure 2A:
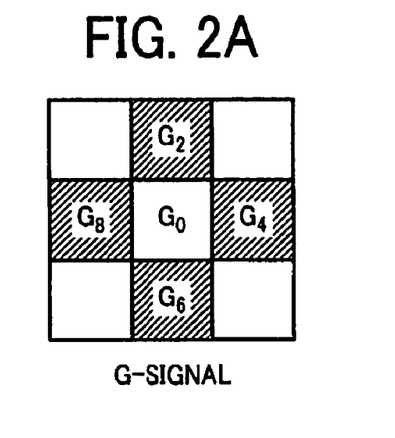
FIGS. 2A to 2C depict a color filter with Bayer array.
Figure 2B:
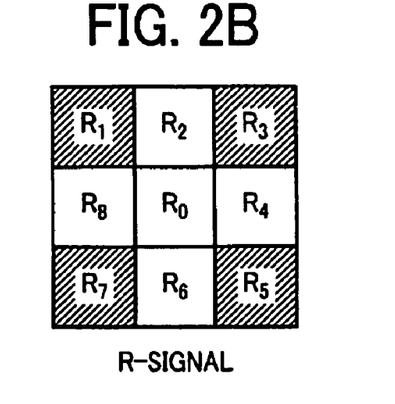
Figure 2C:
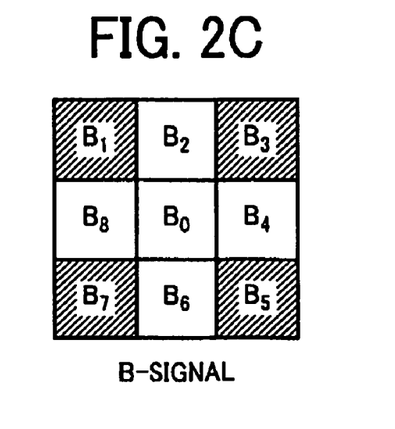

FIGS. 2A to 2C are examples of a color filter with Bayer array. For convenience' sake, R, G, B are separated and shown in FIGS. 2A to 2C; however in practice, RGB are integrally arrayed (Bayer-arrayed), where $G_0$ is obtained by Equations (1) to (6).

$$G_0=(G_2+G_4+G_6+G_8)/4 \qquad (1)$$

$$R_2=(R_1+R_3)/2 \qquad (2)$$

$$R_4=(R_3+R_5)/2 \qquad (3)$$

$$R_6=(R_5+R_7)/2 \qquad (4)$$

$$R_8=(R_1+R_7)/2 \qquad (5)$$

$$R_0=(R_1+R_3+R_5+R_7)/4 \qquad (6)$$

$B_2$, $B_4$, $B_6$, $B_8$, and $B_0$ are the same as the case of $R_2$, $R_4$, $R_6$, $R_8$, and $R_0$.

The MTF correcting unit 150 receives each of the magnification chromatic aberration-corrected and Bayer-interpolated RGB image data to perform MTF correction by using an FIR filter and outputs the respective MTF-corrected RGB image data.

Figure 3:
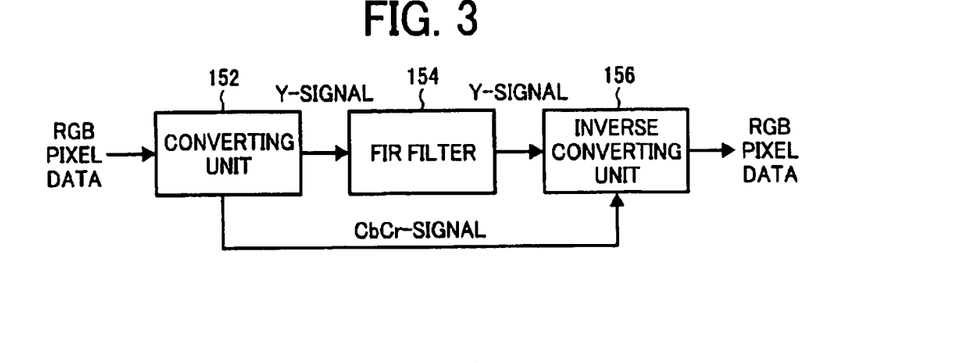
FIG. 3 is a configuration diagram of an example of an MTF correcting unit.

FIG. 3 is a block diagram of the MTF correcting unit 150. A converting unit 152 converts RGB image data into YCbCr image data based on Equations (7) to (9).

$$Y=0.299R+0.587G+0.114B \qquad (7)$$

$$Cr=0.500R-0.419G-0.081B \qquad (8)$$

$$Cb=-0.169R-0.332G+0.500B \qquad (9)$$

Figure 4:
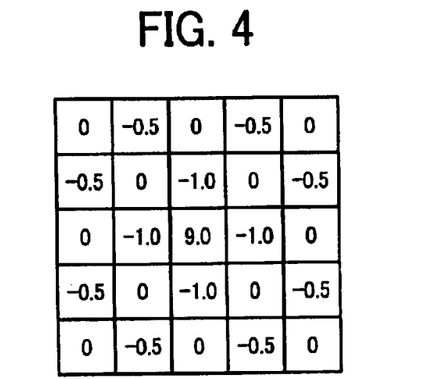
FIG. 4 is an example an FIR filter.

An FIR filter (5×5 filter) 154 receives only a luminance signal Y of YCbCr, and performs predetermined MTF correction. A high quality image with amplification of color noise being suppressed can be obtained by filtering (performing MTF correction) only to the Y-signal. FIG. 4 is a schematic diagram for illustrating an example of the FIR filter. Because the Y-signal is filtered, the MTF correction needs to be performed after the correction of the chromatic aberration of magnification. However, when the MTF correction is performed after the distortion correction, the transformation distance in the coordinate transformation is large in the distortion correction and an arithmetic error easily occurs, as described below. The MTF correction is preferably performed at a subsequent stage of correction of the chromatic aberration of magnification and at a previous stage of the distortion correction as in the present embodiment, to avoid that the error is amplified by the MTF correction to adversely affect the image quality.

An inverse converting unit 156 receives the CbCr-signal and the MTF-corrected Y-signal, and outputs inverse-converted RGB image data based on Equations (10) to (12).

$$R = Y + 1.402 Cr \qquad (10)$$

$$G = Y - 0.714 Cr - 0.344 Cb \qquad (11)$$

$$B = Y + 1.772 Cb \qquad (12)$$

A distortion correcting unit 160 receives the chromatic aberration of magnification-corrected and MTF-corrected RGB image data, performs the coordinate transformation (distortion coordinate transformation) commonly to the respective color components of RGB according to a predetermined equation, and outputs the distortion-corrected RGB image data. Although the distortion is large, the distortion is uniform for respective color components of RGB. Therefore, although a large memory capacity is required for the coordinate transformation in the distortion correcting unit 160, a 1-port memory can be used, and therefore a high-latency memory (DRAM) can be used.

A gamma correcting unit 170 receives the RGB image data output from the distortion correcting unit 160, performs predetermined gamma correction by using respective lookup tables or the like of RGB, and outputs the gamma-corrected RGB image data.

An overall operation of the imaging apparatus according to the embodiment shown in FIG. 1 is as explained above. The magnification-chromatic-aberration correcting unit 130, which is a major configuration of the embodiment, is explained below in detail.

Figure 5A:
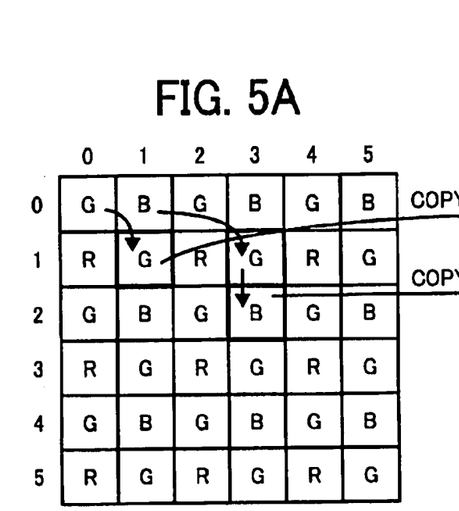
FIGS. 5A and 5B are schematic diagrams for explaining the principle of correction of magnification chromatic aberration of the present invention.
Figure 5B:
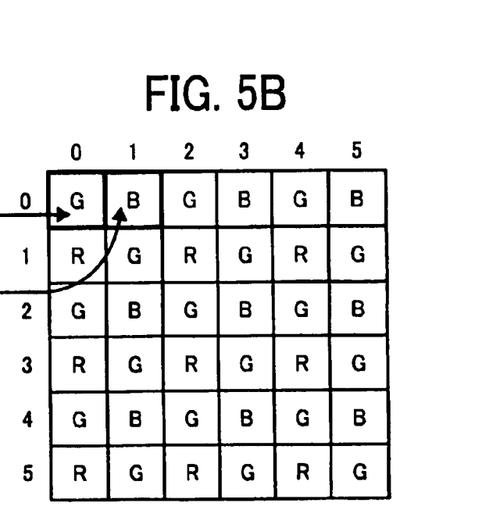

First, the principle of correction of the magnification chromatic aberration of the present invention is explained with reference to FIGS. 5A and 5B. FIG. 5A depicts the Bayer array before coordinate transformation, and FIG. 5B depicts the Bayer array after coordinate transformation. In FIGS. 5A and 5B, the Bayer array has simply 6×6 pixels. However, a resolution VSA has 640×640 pixels, in which the Bayer array in FIGS. 5A and 5B is repeated.

The magnification chromatic aberration shows a different shift for each color component of RGB; however, because the magnitude of the magnification chromatic aberration can be seen based on design data of the optical system, it can be calculated to which position each color component of RGB shifts. In FIG. 5A, it is assumed that a pixel (G) at a position of coordinate (0, 0) is shifted to a position of coordinate (1, 1), and likewise, a pixel (B) at a position of coordinate (1, 0) is shifted to a position of coordinate (3, 1). Correction of the magnification chromatic aberration is basically realized by copying pixel values of pixels at coordinates (1, 0) and (3, 1) to original positions of coordinates (0, 0) and (1, 0), that is, by performing coordinate transformation. Coordinates (1, 0) and (3, 1) are referred to as a coordinate (X, Y) of a source, and coordinates (0, 0) and (1, 0) are referred to as a coordinate (x, y) of a destination. When a coordinate value is referred to, (x, y) and (X, Y) are referred to as coordinate values, so that the coordinate and the coordinate value are used as appropriate according to need.

As described above, when the coordinate transformation is simply performed with respect to the Bayer-arrayed RGB image data, the Bayer array changes before and after the coordinate transformation, and Bayer interpolation cannot be performed correctly at the subsequent stage. Therefore, when the color of the source is the same as that of the destination, the pixel value of the pixel of the source is directly copied to the destination. When the color of the source is different from that of the destination, the coordinate of the source is corrected to a coordinate of the same color as that of the destination and closest to the coordinate of the source, and a pixel value of the pixel at the corrected coordinate is copied to the destination.

In FIG. 5A, the color of the destination at coordinate (0, 0) and the color of the source at coordinate (1, 1) are both green (G). In this case, the pixel value of the pixel (G) at coordinate (1, 1) of the source is directly set as the pixel value of the pixel at coordinate (0, 0) of the destination. On the other hand, the source at coordinate (1, 0) is blue (B) whereas the destination at coordinate (3, 1) is green (G). In this case, the source is corrected to a coordinate of the same color, blue (B), as that of coordinate (1, 0) of the destination and closest to coordinate (3, 1) (in FIG. 5A, coordinate (3, 2)), and the pixel value of the pixel (B) at the corrected coordinate (3, 2) is set as the pixel value of the pixel at coordinate (1, 0) of the destination. Accordingly, as shown in FIG. 5B, the Bayer array after the coordinate transformation is maintained in the Bayer array before the coordinate transformation in FIG. 5A. Three examples are shown below as a specific configuration of the magnification-chromatic-aberration correcting unit 130.

Figure 6:
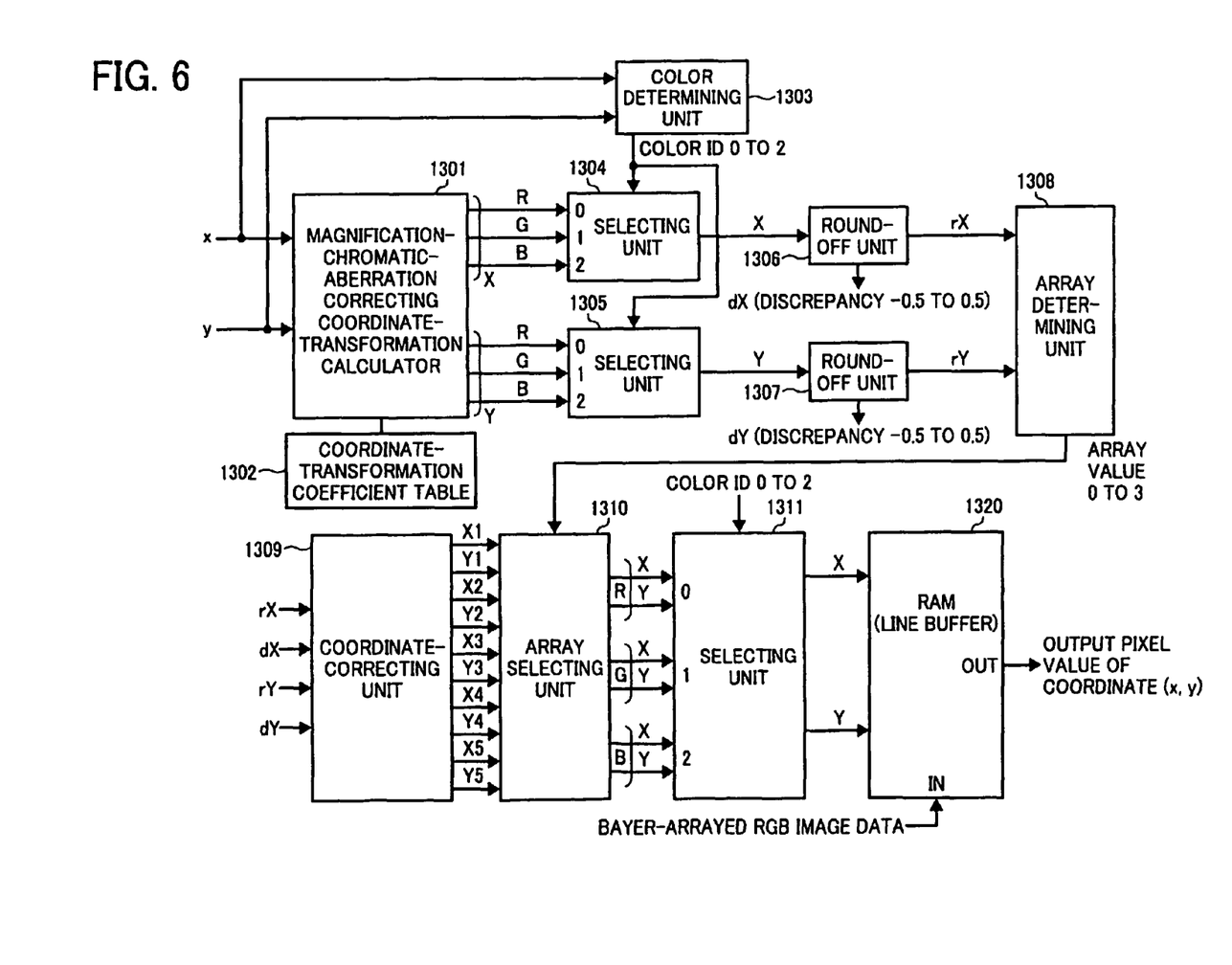
FIG. 6 is an overall configuration diagram of a magnification-chromatic-aberration correcting unit shown in FIG. 1.

FIG. 6 is an overall configuration diagram of the magnification-chromatic-aberration correcting unit 130 according to a first example. As explained by FIGS. 5A and 5B, when the color of the source coordinate is the same as that of the destination coordinate, the pixel value of the pixel of the source coordinate is set as the pixel value of the pixel of the destination coordinate; however, when the color of the source coordinate is different from that of the destination coordinate, a pixel value of a pixel at a coordinate of the same color as that of the destination coordinate closest to the source coordinate is set as the pixel value of the pixel of the destination coordinate. In FIG. 6, a coordinate transforming unit that generates the coordinate value (X, Y) of the source with respect to the coordinate value (x, y) of the destination is constituted by a magnification-chromatic-aberration correcting coordinate-transformation calculator 1301, a coordinate-transformation coefficient table 1302, a color determining unit 1303, selecting units 1304 and 1305, round-off units 1306 and 1307, an array determining unit 1308, a coordinate correcting unit 1309, an array selecting unit 1310, and a selecting unit 1311. A line buffer (coordinate transformation memory) 1320 is constituted by using a 1-port RAM or the like. The line buffer 1320 needs to have the number of lines corresponding to the largest deviation amount in the y direction of the magnification chromatic aberration at least, however, the line buffer 1320 can have more number of lines.

The Bayer-arrayed RGB image data with the magnification chromatic aberration and the distortion is sequentially written in the line buffer 1320 in a first-in first-out (FIFO) format from the top line according to the coordinate value (x, y). The magnification chromatic aberration-corrected and Bayer-arrayed RGB image data is sequentially read from the line buffer 1320 based on the coordinate value (X, Y) output from the selecting unit 1311, parallel to the write operation (actually, delayed for predetermined time). That is, the pixel value of the pixel at the coordinate (X, Y) is read as the pixel value of the pixel at the coordinate (x, y). As described later, when the Bayer array color of the coordinate (X, Y) is different from that of the coordinate (x, y), the coordinate (X, Y) is corrected to a coordinate of the same color as that of the coordinate (x, y) closest to the coordinate (X, Y), and therefore the Bayer array of the RGB image data output from the line buffer 1320 is maintained. The configuration in FIG. 6 is described below in detail.

The magnification-chromatic-aberration correcting coordinate-transformation calculator 1301 receives the coordinate value (x, y) of the destination to calculate the coordinate value X, Y of the source corresponding to RGB according to a predetermined formula of coordinate transformation such as a polynomial, and outputs the coordinate value to the selecting units 1304 and 1305.

When the center of the screen is assumed as the origin, the formula of coordinate transformation can be expressed as, for example, $$X = x + [a(1) + a(2) \times abs(x) + a(3) \times abs(y) + a(4) \times y^2] \times x$$

$$Y = y + [b(1) + b(2) \times abs(y) + b(3) \times abs(x) + b(4) \times x^2] \times y \qquad (13)$$

where abs( ) denotes an absolute value, a(1) to a(4) and b(1) to b(4) denote coordinate transformation coefficients. The coordinate transformation coefficients are held beforehand in the coordinate-transformation coefficient table 1302.

The color determining unit 1303 receives the coordinate value (x, y), and obtains a color ID corresponding to the color of the coordinate (x, y) of the destination focused in the Bayer array according to a lookup table (LUT) or the like. For example, the color ID is stored beforehand in the LUT, designating the coordinate value (x, y) as an address. The color ID is assumed here as R=0, G=1, and B=2.

Figure 7:
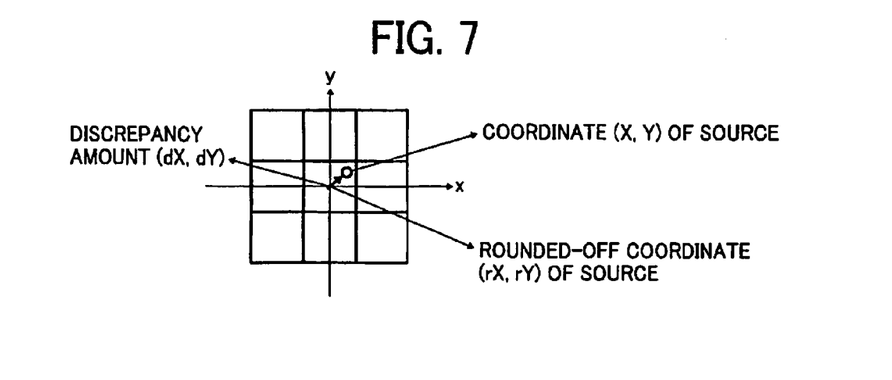
FIG. 7 depicts a relation between a coordinate value of a source, a coordinate value obtained by rounding off the coordinate value, and discrepancies between those.

The selecting units 1304 and 1305 select a coordinate value X, Y of one color from the coordinate values X, Y of the source corresponding to RGB calculated by the magnification-chromatic-aberration correcting coordinate-transformation calculator 1301 based on the color ID obtained by the color determining unit 1303. The coordinate value X, Y is not limited to an integer according to equation (13). The round-off units 1306 and 1307 round off the coordinate value X, Y selected by the selecting units 1304 and 1305 (to the whole number), and output the integer of the coordinate value rX, rY of the source corresponding to the pixel. Simultaneously, the round-off units 1306 and 1307 output respective discrepancies (differences) dX, dY between X and rX, and Y and rY, where dX and dY take a value of from −0.5 to 0.5. FIG. 7 depicts a relation between the coordinate value X, Y of the source obtained by the calculation, the coordinate value rX, rY obtained by rounding off the coordinate value X, Y, and the discrepancies dX, dY between those. One square surrounded by a frame in FIG. 7 depicts one pixel.

Figure 8:
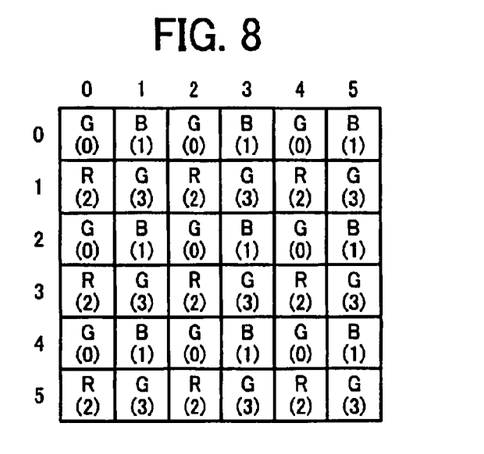
FIG. 8 is a schematic diagram for explaining an operation by an array determining unit shown in FIG. 6.
Figure 9A:
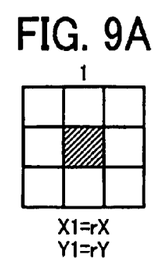
FIGS. 9A to 9E depict a content of calculation performed by a coordinate correcting unit shown in FIG. 6.
Figure 9B:
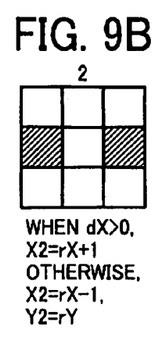
Figure 9C:
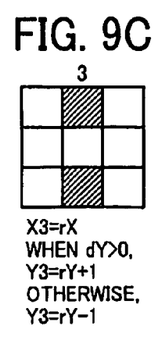
Figure 9D:
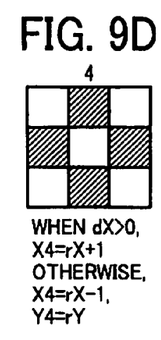
Figure 9E:
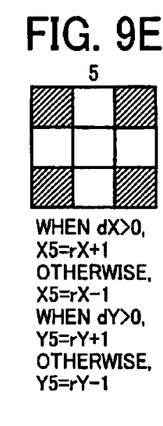

The array determining unit 1308 receives rX, rY and obtains an array value of the focused coordinate (rX, rY) of the source in the Bayer array according to the lookup table. An example of the array value in the Bayer array in FIGS. 5A and 5B is shown in FIG. 8. In FIG. 8, a numerical value described in brackets in each pixel indicates the array value. It is assumed here that the array value is 0 to 3, however, any number can be used so long as the array can be identified.

On the other hand, the coordinate correcting unit 1309 receives rX, rY, dX, and dY and corrects rX and rY according to the values of dX and dY. That is, the coordinate correcting unit 1309 calculates the coordinate value of the source after the correction. The coordinate correcting unit 1309 calculates the coordinate value of the source after the correction, respectively, for all types of array patterns of the same color that can be obtained in the Bayer array.

FIGS. 9A to 9E depict a content of the calculation performed by the coordinate correcting unit 1309. One square surrounded by the frame in FIGS. 9A to 9E indicates a pixel as in FIG. 7. In the Bayer array, the array pattern of the same color is classified into five of 1 to 5 in FIGS. 9A to 9E. The square in the middle of the 3×3 square is the focused source to be corrected. As shown in FIG. 7, the coordinate rX and rY corresponds to a central position of the middle square. The coordinate correcting unit 1309 corrects rX and rY according to dX and dY for respective patterns 1 to 5 in FIGS. 9A to 9E. Specifically, the coordinate correcting unit 1309 performs calculation according to (a) to (e) written below the patterns 1 to 5 in FIGS. 9A to 9E, and outputs X1 and Y1, X2 and Y2, X3 and Y3, X4 and Y4, and X5 and Y5, respectively. That is, the coordinate after the correction indicates any one of shaded squares for respective patterns in FIGS. 9A to 9E.

In FIGS. 9A to 9E, pattern 1 is applied to a case that the destination and the source are the same color. On the other hand, patterns 2 to 5 are applied to a case that the destination and the source are different colors. Pattern 1 is applied to any colors of RGB. Patterns 2, 3, and 5 are applied to a case that the color of the source is R or B, and pattern 4 is applied to a case that the color of the source is G.

Figure 10:
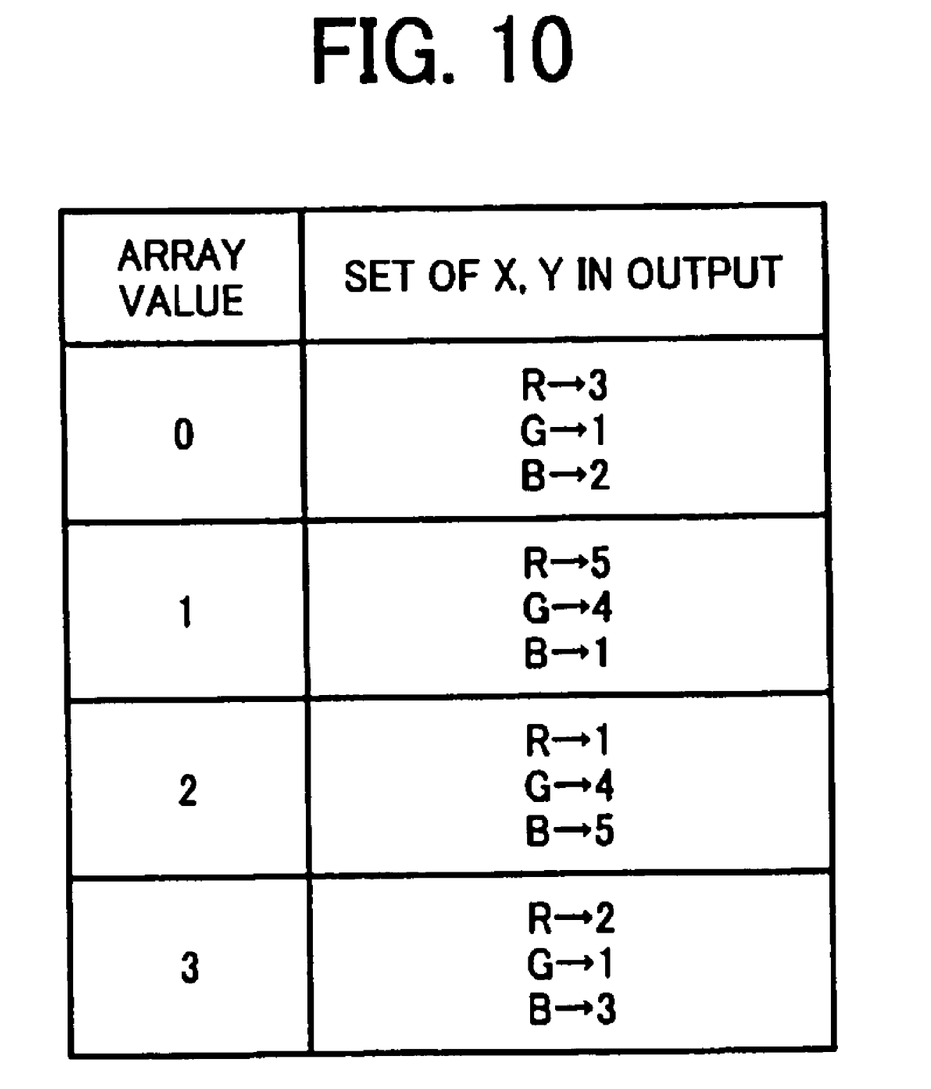
FIG. 10 depicts an operation by the array determining unit.

The array selecting unit 1310 receives X1, Y2, X2, Y2, X3, Y3, X4, Y4, X5, and Y5, and selects the coordinate value X, Y of the source after the correction of respective colors of R. G, and B based on the array value obtained by the array determining unit 1308. FIG. 10 depicts correspondence between the array value and X, Y. For example, when the array value is 0, a set of X3 and Y3 in pattern 3 is designated as X, Y for R, a set of X1 and Y1 in pattern 1 is designated as X, Y for G, and a set of X2 and Y2 in pattern 2 is designated as X, Y for B. The same applies when the array value is 1, 2, or 3.

The selecting unit 1311 receives a set of X, Y of respective colors of R, G, and B, selects a set of X, Y of the same color as that of the destination based on the color ID obtained by the color determining unit 1303, and transmits the set to the line buffer 1320. As a result, the line buffer 1320 reads the pixel value of the pixel at the coordinate (X, Y) as the pixel value of the pixel at the coordinate (x, y). Because the coordinate (X, Y) and the coordinate (x, y) are maintained in the same color, the Bayer array does not change before and after the coordinate transformation.

A specific example of the processing is explained with reference to FIGS. 5A and 5B. A case that the coordinate (x, y) of the destination is (0, 0) and the coordinate (X, Y) of the source is (1, 1) is explained. In this case, the color determining unit 1303 outputs G(1) as the color ID. The magnification-chromatic-aberration correcting coordinate-transformation calculator 1301 calculates (X, Y) for RGB, respectively, by inputting the coordinate (0, 0), and the selecting units 1304 and 1305 output (X, Y) of G. The round-off units 1306 and 1307 round off (X, Y), and output (1, 1) as (rX, rY). The array determining unit 1308 outputs 3 as the array value based on FIG. 8. The individual calculation performed by the coordinate correcting unit 1309 is omitted here. The array selecting unit 1310 selects (X2, Y2) as (X, Y) for R, (X1, Y1) as (X, Y) for G, and (X3, Y3) as (X, Y) for B based on FIG. 10. The selecting unit 1311 selects (X1, Y1) of (X, Y) for G, because the color ID is G(1). According to FIGS. 9A to 9E, (X1, Y1)=(rX, rY), and ultimately the coordinate (1, 1) of the source directly becomes an output from the selecting unit 1311. The line buffer 1320 reads the pixel value of the pixel at coordinate (1, 1) as the pixel value of the pixel at coordinate (0, 0).

A case that the coordinate (x, y) of the destination is (1, 0) and the coordinate (X, Y) of the source is (3, 1) is explained next. In this case, the color determining unit 1303 outputs (B2) as the color ID. The magnification-chromatic-aberration correcting coordinate-transformation calculator 1301 calculates (X, Y) for RGB, respectively, by inputting the coordinate (1, 0), and the selecting units 1304 and 1305 output (X, Y) of B. The round-off units 1306 and 1307 round off (X, Y), and output (3, 1) as (rX, rY). Further, it is assumed that the round-off units 1306 and 1307 output dX=0, dY=+0.2 as the discrepancies dX, dY. The array determining unit 1308 outputs 3 as the array value based on FIG. 8. The individual calculation performed by the coordinate correcting unit 1309 is omitted here. The array selecting unit 1310 selects (X2, Y2) as (X, Y) for R, (X1, Y1) as (X, Y) for G, and (X3, Y3) as (X, Y) for B based on FIG. 10. The selecting unit 1311 selects (X3, Y3) of (X, Y) for B, because the color ID is B(2). According to FIGS. 9A to 9E, (X3, Y3) is such that X3=rX, but Y3=rY+1 in the case of dY>0, otherwise, Y3=rY−1. Because dY=+0.2, (X3, Y3)=(rX, rY+1), and ultimately the output from the selecting unit 1311 becomes (3, 2). The line buffer 1320 reads the pixel value of the pixel at coordinate (3, 2) as the pixel value of the pixel at coordinate (1, 0).

According to the configuration of FIGS. 5A and 5B, when the color of the coordinate of the source is the same as that of the destination, the coordinate of the source is left as it is, and when the color is different from each other, the coordinate of the source can be corrected to a coordinate of the same color as that of the destination and closest to the coordinate of the source. As a result, even if correction of magnification chromatic aberration is performed directly with respect to the Bayer-arrayed RGB image data, the Bayer array can be maintained before and after the coordinate transformation. Further, a 1-port RAM can be used as the coordinate transformation memory. Accordingly, in the first example, a cheap 1-port RAM with the memory amount being ⅓ can be used, as compared to the conventional case requiring a 3-port large-capacity memory.

Figure 11:
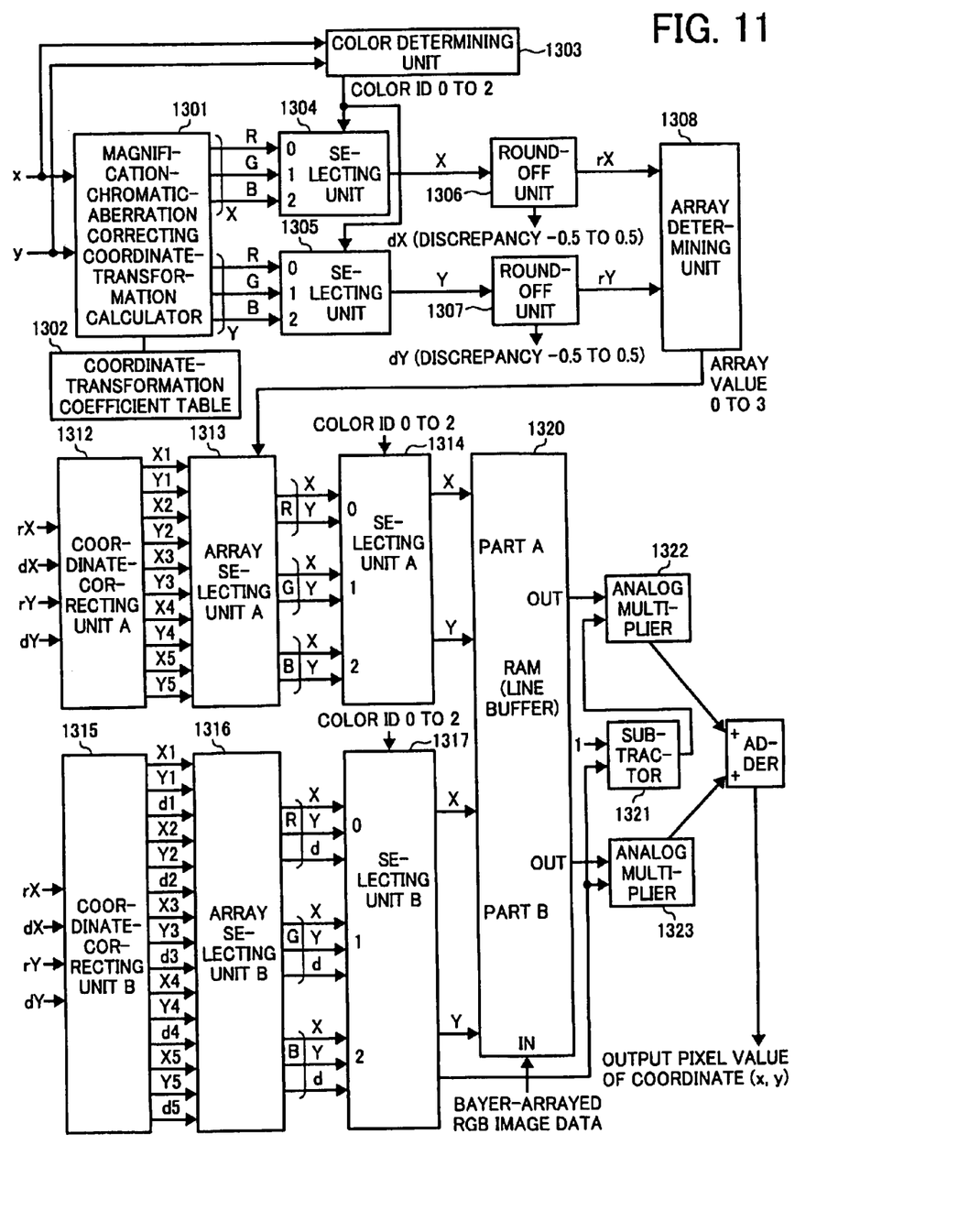
FIG. 11 is an overall configuration diagram of the magnification-chromatic-aberration correcting unit shown in FIG. 1 in a second example.
Figure 12A:
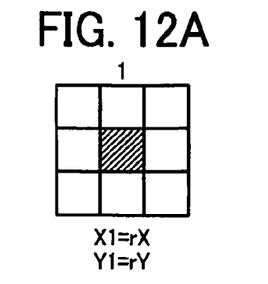
FIGS. 12A to 12E depict a content of calculation performed by a coordinate correcting unit A shown in FIG. 11.
Figure 12B:
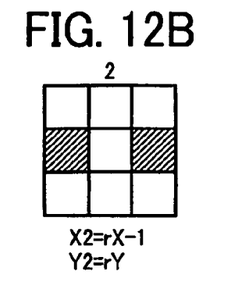
Figure 12C:
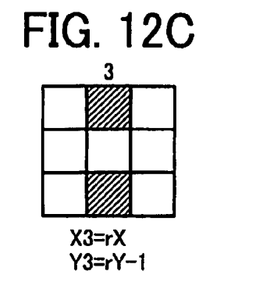
Figure 12D:
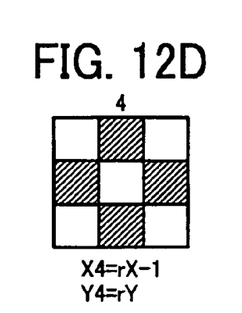
Figure 12E:
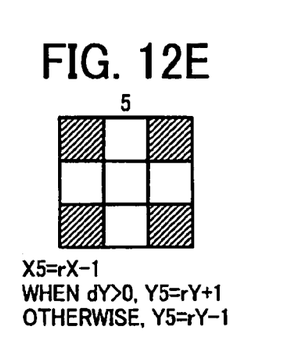
Figure 13A:
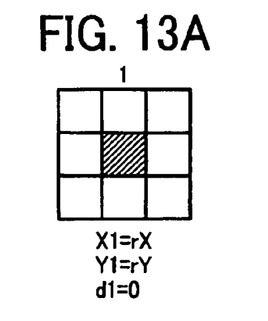
FIGS. 13A to 13E depict a content of calculation performed by a coordinate correcting unit B shown in FIG. 11.
Figure 13B:
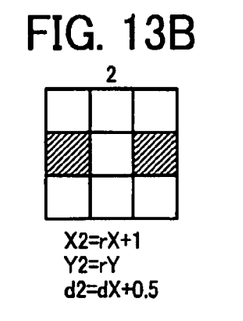
Figure 13C:
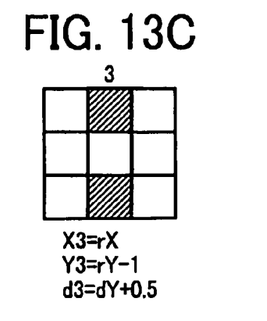
Figure 13D:
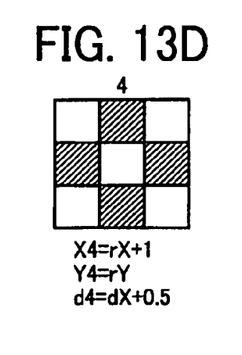
Figure 13E:
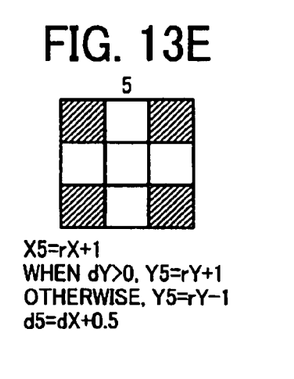

FIG. 11 is an overall configuration diagram of the magnification-chromatic-aberration correcting unit 130 according to a second example. The same as in the first example applies to the second example, when the color of the coordinate of the source is the same as that of the destination. However, when the color is different from each other, two coordinates of the same color as that of the coordinate of the destination near the coordinate of the source are selected, and the pixel value of the pixel corresponding to the coordinate of the destination is interpolated based on the pixel values of the respective coordinates, and the interpolated pixel value is designated as the pixel value of the coordinate of the destination.

In FIG. 11, because the processing in the magnification-chromatic-aberration correcting coordinate-transformation calculator 1301, the color determining unit 1303, the selecting units 1304 and 1305, the round-off units 1306 and 1307, and the array determining unit 1308 is the same as that shown in FIG. 6, explanations thereof will be omitted.

A coordinate correcting unit A 1312 and a coordinate correcting unit B 1315 respectively input rX, rY, dx, dy as in the coordinate correcting unit 1309 in FIG. 6, to calculate the coordinate value of the source after the correction for all types (patterns 1 to 5) that can be obtained for the array patterns of the same color in the Bayer array, that is, calculate the coordinate value of different coordinates such as left and right, above and below, or diagonal of the focused coordinate (dx, dy) of the source to be corrected. Simultaneously, the coordinate correcting unit B 1315 newly calculates a value d as well. As described later, d is used as a weighting coefficient at the time of performing interpolation with respect to the pixels of the two coordinates.

FIGS. 12A to 12E depict a content of calculation performed by the coordinate correcting unit A 1312. The patterns 1 to 5 in FIGS. 12A to 12E are the same as those in FIGS. 9A to 9E. In the second example, the coordinate correcting unit A 1312 receives rX, rY, dX, dY, performs calculation according to (a) to (e) written below the patterns 1 to 5 in FIGS. 12A to 12E, and outputs X1 and Y1, X2 and Y2, X3 and Y3, X4 and Y4, and X5 and Y5, respectively. In pattern 1, the coordinate (rX, rY) (central coordinate) of the source is designated as (X1, Y1) as it is. In pattern 2, the left coordinate of the coordinate (rX, rY) of the source is designated as (X2, Y2). In pattern 3, a coordinate immediately above the coordinate (rX, rY) is designated as (X3, Y3). In pattern 4, the left coordinate of the coordinate (rX, rY) is designated as (X4, Y4) as in pattern 2. A vertical direction is ignored here. In pattern 5, a coordinate at lower left or upper left of the coordinate (rX, rY) is designated as (X5, Y5) according to dY.

FIGS. 13A to 13E depict a content of calculation performed by the coordinate correcting unit B 1315. The coordinate correcting unit B 1315 receives rX, rY, dX, dY, performs calculation according to (a) to (e) written below the patterns 1 to 5 in FIGS. 13A to 13E, and outputs X1 and Y1, X2 and Y2, X3 and Y3, X4 and Y4, and X5 and Y5, respectively. The coordinate correcting unit B 1315 also outputs values d1, d2, d3, d4, and d5 simultaneously. In FIGS. 13A to 13E, pattern 1 is the same as that in FIG. 12A. Patterns 2 to 5 are different from those in FIGS. 12B to 12E. That is, in pattern 2, the right coordinate of the coordinate (rX, rY) (central coordinate) of the source is designated as (X2, Y2), and d2=d×0.5 is also output. In pattern 3, a coordinate immediately below the coordinate (rX, rY) is designated as (X3, Y3), and d3=dY+0.5 is also output. In pattern 4, the right coordinate of the coordinate (rX, rY) is designated as (X4, Y4) as in pattern 2 (ignoring the vertical direction), and d4=dX+0.5 is also output. In pattern 5, a coordinate at lower right or upper right of the coordinate (rX, rY) is designated as (X5, Y5) according to dY, and d5=dX+0.5 is also output. As described later, weighting according to the distance equal to or less than one pixel is performed at the time of performing interpolation with respect to the pixels of the two coordinates, according to d1 to d5.

As described above, pattern 1 is applied to the case that the destination and the source are the same color, and patterns 2 to 5 are applied to the case that the destination and the source are different colors. Pattern 1 is applied to any colors of RGB. Patterns 2, 3, and 5 are applied to the case that the color of the source is R or B, and pattern 4 is applied to the case that the color of the source is G.

An array selecting unit A 1313 receives X1, Y1, x2, Y2, X3, Y3, X4, Y4, X5, Y5 output from the coordinate correcting unit A 1312 and selects a coordinate value X, Y of the source after correction of the respective colors of R, G, and B based on the array value obtained by the array determining unit 1308. A selecting unit A 1314 receives sets of X, Y of the respective colors of R, G, and B output from the array selecting unit A 1313, selects a set of X, Y of the same color as that of the destination based on the color ID obtained by the color determining unit 1303, and transmits the set to the line buffer 1320. The processing in the array selecting unit A 1313 and the selecting unit A 1314 is the same as that in the array selecting unit 1310 and the selecting unit 1311 in FIG. 6.

An array selecting unit B 1316 receives X1, Y1, d1, X2, Y2, d2, X3, Y3, d3, X4, Y4, d4, X5, Y5, d5 output from the coordinate correcting unit B 1315 and selects a coordinate value X, Y of the source after correction of the respective colors of R, G, and B, and a weighting coefficient d based on the array value obtained by the array determining unit 1308. The selecting unit B 1317 receives sets of X, Y, d of the respective colors of R, G, and B output from the array selecting unit B 1316, selects a set of X, Y, d of the same color as that of the destination based on the color ID obtained by the color determining unit 1303, and transmits the set of X, Y to the line buffer 1320, and the weighting coefficient d to a subtracter 1321 and an analog multiplier 1323. The processing in the array selecting unit B 1316 and the selecting unit B 1317 is the same as that in the array selecting unit 1310 and the selecting unit 1311 in FIG. 6; however, a point that the coefficient d is newly output is different.

As described above, the line buffer 1320 needs only to have the number of lines corresponding to the largest deviation amount in the y direction of the magnification chromatic aberration at least, however, the line buffer 1320 can have more number of lines. However, in the second example, the line buffer 1320 is constituted by using a 2-port RAM or the like.

The Bayer-arrayed RGB image data with the magnification chromatic aberration and the distortion is sequentially written in the line buffer 1320 in the FIFO format from the top line the according to the coordinate value (x, y). Pixel values of pixels of two different coordinates (X, Y) are read as the pixel value of the pixel corresponding to the coordinate (x, y) from the line buffer 1320 based on the coordinate value (X, Y), based on the coordinates (X, Y) output from the selecting unit A 1314 and the selecting unit B 1317, parallel to the write operation (actually, delayed for predetermined time). According to FIGS. 8, 12, and 13, the two different coordinates (X, Y) and (x, y) are of the same color. The two coordinates (X, Y) become the same coordinate (rX, rY), in the case of the same color pattern 1.

The subtracter 1321 subtracts value d output from the selecting unit B 1317 together with the coordinate (X, Y) from 1. An analog multiplier 1322 multiplies the pixel value of the pixel at the coordinate (X, Y) read from the line buffer 1320 based on the coordinate value (X, Y) from the selecting unit A 1314 by the output value of the subtracter 1321. On the other hand, the analog multiplier 1323 multiplies the pixel value of the pixel at the coordinate (X, Y) read from the line buffer 1320 based on the coordinate value (X, Y) from the selecting unit B 1317 by the value d output from the selecting unit B 1317 together with the coordinate value (X, Y). An adder 1324 adds the output values from the analog multipliers 1322 and 1323 and designates the added value as the pixel value of the pixel at the coordinate (x, y). That is, the pixel value obtained by weighting the pixel values of pixels of two coordinates (X, Y) near the coordinate (rX, rY) of the source according to the weighting coefficient d and adding these pixel values is output from the adder 1324 as the pixel value of the coordinate of the destination. Because the coordinate (X, Y) and the coordinate (x, y) are maintained in the same color, the Bayer array does not change before and after the coordinate transformation.

A specific example of the processing is explained with reference to FIGS. 5A and 5B. A case that the coordinate (x, y) of the destination is (0, 0) and the coordinate (rX, rY) of the source is (1, 1) is explained first. In this case, the selecting unit A 1314 outputs (1, 1) as (X, Y), and the selecting unit B 1317 also outputs (1, 1) as (X, Y), and d=0 simultaneously (halfway processing is omitted). Accordingly, the line buffer 1320 reads the two pixel values of the pixel of the same coordinate (1, 1). Because d=0, an output from the subtracter 1321 is 1, and therefore the analog multiplier 1322 directly outputs the pixel value of the pixel at the coordinate (1, 1). The output of the subtracter 1321 is 0. Ultimately, the adder 1324 outputs the pixel value of the pixel at the coordinate (1, 1) as the pixel value of the pixel at the coordinate (0, 0).

A case that the coordinate (x, y) of the destination is (1, 0) and the coordinate (rX, rY) of the source is (3, 1) is explained next. In this case, the selecting unit A 1314 outputs (3, 0) as (X, Y) (halfway processing is omitted). The selecting unit B 1317 outputs (3, 2) as (X, Y), and d=0.7 (d3=dY+0.5, dY=0.2) simultaneously (halfway processing is omitted). Accordingly, the line buffer 1320 reads a pixel value A of the pixel at the coordinate (3, 0) and a pixel value B of the pixel at the coordinate (3, 2), respectively. Because d=0.7, an output from the subtracter 1321 becomes 0.3, an output from the analog multiplier 1322 becomes 03×A, and an output from the analog multiplier 1323 becomes 0.7×B. The adder 1324 outputs a value obtained by adding the outputs from the analog multipliers 1322 and 1323. Thus, the adder 1324 outputs a pixel value obtained by weighting the pixel values of pixels of the two coordinates (X, Y) according to the weighting coefficient d and adding these pixel values as the pixel value of the pixel at the coordinate (x, y).

According to the configuration in FIG. 11, a 2-port RAM or the like is required for the line buffer. However, when the color of the coordinate of the source is different from that of the destination, the pixel value of the pixel corresponding to the coordinate of the destination is interpolated from the pixel values of the two coordinates of the same color as that of the coordinate of the destination near the coordinate of the source, thereby enabling to improve the image quality at the coordinate of the destination. Of course, the Bayer array is maintained before and after the coordinate transformation.

A pixel value of a pixel corresponding to the coordinate of the destination can be interpolated from the pixel values of three or more coordinates of the same color as that of the coordinate of the destination near the coordinate of the source by extending the configuration of FIG. 11 (for example, pixel values of four pixels are interpolated). In this case, the image quality of the pixel of the destination can be further improved. However, the number of ports of the line buffer increases.

A third example is basically the same as the second example, however, when the color of the coordinate of the source is different from that of the destination, as the two coordinates of the same color as that of the coordinate of the destination near the coordinate of the source, the coordinates are unified to two coordinates in the same direction (x) as a reading direction of the imaging device 110. The overall configuration of the magnification-chromatic-aberration correcting unit 130 is the same as that shown in FIG. 11, and therefore explanations thereof will be omitted. The contents of calculation in the coordinate correcting unit A 1312 and the coordinate correcting unit B 1315 are partly different from those in the second example.

FIGS. 14A to 14E depict the content of calculation in the coordinate correcting unit A 1312, and FIGS. 15A to 15E depict the content of calculation in the coordinate correcting unit B 1315. In FIGS. 14A to 14E, only pattern 3 is different from FIGS. 12 and 13. That is, in patterns 1, 2, 4 and 5, the set of two coordinates (the same coordinate in pattern 1) in the same direction (x) as the reading direction of the imaging device 110 is selected both in FIGS. 12 and 13. In pattern 3, in FIGS. 12 and 13, the set of two coordinates in the y direction is selected. On the other hand, in the third example, as shown in FIGS. 14 and 15, in pattern 3, the same coordinate above or below the coordinate of the source is selected as the set of the two coordinates. The weighting coefficient d3 is set to be 0. Accordingly, interpolation is performed in the same manner as for pattern 1. Therefore, the set of two coordinates in the same direction (x) as the reading direction of the imaging device 110 can be selected in any case of patterns 1 to 5.

Figure 14A:
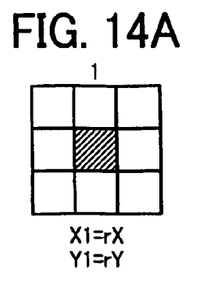
FIGS. 14A to 14E depict a content of calculation in a coordinate correcting unit A of a magnification-chromatic-aberration correcting unit according to a third example.
Figure 14B:
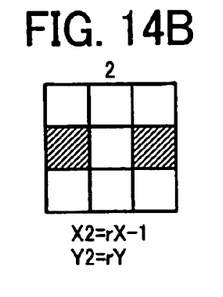
Figure 14C:
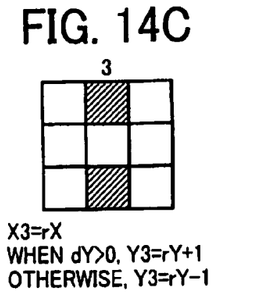
Figure 14D:
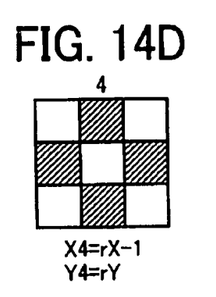
Figure 14E:
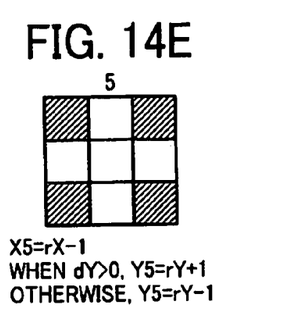
Figure 15A:
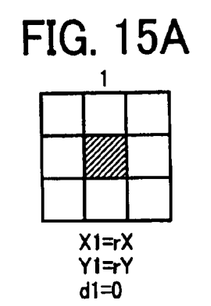
FIGS. 15A to 15E depict a content of calculation in a coordinate correcting unit B of the magnification-chromatic-aberration correcting unit according to the third example.
Figure 15B:
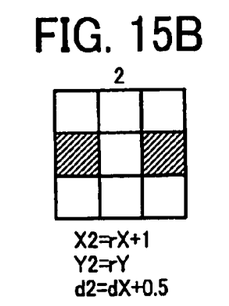
Figure 15C:
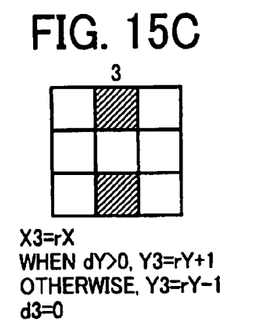
Figure 15D:
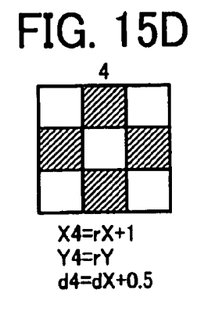
Figure 15E:
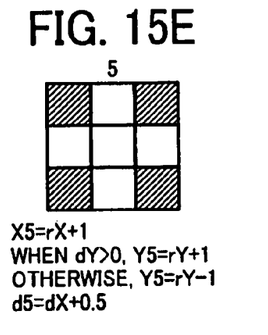

When the reading direction of the imaging device 110 is the y direction, the set of two coordinates in the y direction can be selected by changing the calculation contents of the coordinate correcting unit A 1312 and the coordinate correcting unit B 1315.

According to the third example, burst read in the line buffer can be easily performed, and random access to the RAM or the like can be reduced. Therefore, a low-cost and low-speed RAM or the like can be used.

With regard to the configuration of FIG. 1, three examples of the magnification-chromatic-aberration correcting unit 130 have been explained. However, a configuration in which the magnification-chromatic-aberration correcting unit 130 can correct the magnification chromatic aberration and the distortion at the same time can be also used. In this case, the distortion correcting unit 160 can be omitted, and the coordinate transformation memory for correction of the distortion is not required. The configuration in which the magnification chromatic aberration and the distortion are corrected at the same time is basically the same as the configuration shown in FIGS. 6 and 11, and the magnification chromatic-aberration correcting coordinate-transformation calculator 1301 can be changed to a coordinate transformation calculator for correcting the magnification chromatic aberration and the distortion. In this calculator, a coordinate value (x, y) of the destination is input, and a coordinate value obtained by adding the distortion to the magnification chromatic aberration is calculated and output as the coordinate value X, Y of the source corresponding to RGB according to a predetermined formula of coordinate transformation. The processing thereafter is basically the same as that explained in the first, second, and third examples.

According to one aspect of the present invention, by performing correction of the magnification chromatic aberration directly with respect to the image data in the color filter array, the capacity of the coordinate transformation memory used for correction of the magnification chromatic aberration can be reduced.

The correction of the magnification chromatic aberration can maintain the color filter array before and after the coordinate transformation.

Furthermore, according to another aspect of the present invention, the image quality can be improved.

When two coordinates near the source are used, a 2-port RAM or the like can be used as the coordinate transformation memory. Further, a low-cost and low-speed RAM or the like can be used.

By incorporating the image processing apparatus of the present invention, a low-cost imaging apparatus can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of processing image data in a color filter array, the image data including a magnification chromatic aberration captured by an imaging device, the method comprising:
correcting the magnification chromatic aberration by performing a coordinate transformation with respect to each pixel in the image data; and
compensating for a defective pixel due to the color filter array with respect to magnification-chromatic-aberration-corrected image data, wherein the correcting includes,
setting a pixel value of a pixel of a coordinate transformation destination as that of a pixel value of a pixel of a coordinate transformation source, if a color of the color filter array of the coordinate transformation source is same as that of the coordinate transformation destination, and
setting the pixel value of the pixel of the coordinate transformation destination to that of a pixel closest to the coordinate transformation source of the same color, if the color of the color filter array of the coordinate transformation source is different from that of the coordinate transformation destination.

2. The method according to claim 1, wherein there are two coordinates of the same color as that of the coordinate transformation destination located closest to the coordinate transformation source.

3. The method according to claim 2, wherein the two coordinates of the same color as that of the coordinate transformation destination located closest to the coordinate transformation source are coordinates in a direction that is same as a reading direction of the imaging device.

4. The method according to claim 1, wherein the correcting includes correcting a distortion of the image data.

5. The method according to claim 1, further comprising correcting a distortion with respect to the image data in which a defective pixel due to the color filter array in the magnification-chromatic-aberration-corrected image data is interpolated at a subsequent stage of the compensating.

6. An apparatus for processing image data in a color filter array including at least a magnification chromatic aberration captured by an imaging device, the apparatus comprising:
a magnification-chromatic-aberration correcting unit configured to correct the magnification chromatic aberration by performing a coordinate transformation with respect to each pixel in the image data by,
setting a pixel value of a pixel of a coordinate transformation destination as that of a pixel value of a pixel of a coordinate transformation source, if a color of the color filter array of the coordinate transformation source is same as that of the coordinate transformation destination, and
setting the pixel value of the pixel of the coordinate transformation destination to that of a pixel closest to the coordinate transformation source of a same color, if the color of the color filter array of the coordinate transformation source is different from that of the coordinate transformation destination; and
a compensating unit configured to compensate for a defective pixel due to the color filter array with respect to magnification-chromatic-aberration-corrected image data.

7. The apparatus according to claim 6, wherein the magnification-chromatic-aberration correcting unit sets the pixel value of the coordinate transformation destination if the color of the color filter array of the coordinate transformation source is different from that of the coordinate transformation destination as a pixel at coordinates of the same color as that of the coordinate transformation destination closest to the coordinate transformation source.

8. The apparatus according to claim 6, wherein there are two coordinates of the same color as that of the coordinate transformation destination located closest to the coordinate transformation source.

9. The apparatus according to claim 8, wherein the two coordinates of the same color as that of the coordinate transformation destination located closest to the coordinate transformation source are coordinates in a direction that is the same as a reading direction of the imaging device.

10. The apparatus according to claim 6, wherein the magnification-chromatic-aberration correcting unit further corrects a distortion of the image data.

11. The apparatus according to claim 6, further comprising a distortion correcting unit that corrects a distortion with respect to the image data in which a defective pixel due to the color filter array in the magnification-chromatic-aberration-corrected image data is interpolated at a subsequent stage of the compensating unit.

12. An imaging apparatus comprising:
an optical system having a wide view angle;
an imaging device that is includes a color filter in a color array, and is configured to capture an image through the optical system, the image captured including a magnification chromatic aberration; and
an image processing apparatus that processes image data in a color filter array, wherein
the image processing apparatus includes,
a magnification-chromatic-aberration correcting unit configured to correct the magnification chromatic aberration by performing a coordinate transformation with respect to each pixel in the image data, and
a compensating unit configured to compensate for a defective pixel due to the color filter array with respect to magnification-chromatic-aberration-corrected image data, wherein the correcting includes,
setting a pixel value of a pixel of a coordinate transformation destination as that of a pixel value of a pixel of a coordinate transformation source, if the color of the color filter array of the coordinate transformation source is the same as that of the coordinate transformation destination, and
setting the pixel value of the pixel of the coordinate transformation destination to that of a pixel value of a pixel closest to the coordinate transformation source of a same color as that of the coordinate transformation destination, if the color of the color filter array of the coordinate transformation source is different from that of the coordinate transformation destination.

* * * * *